United States Patent Office 3,480,590
Patented Nov. 25, 1969

3,480,590
POLYMERISATION PROCESS
Herbert May, Oldbury, near Birmingham, Brian John Kendall-Smith, Northfield, Birmingham, and Susannah Burr, Camargue, Welland, England, assignors to British Industrial Plastics Limited, Manchester, England
No Drawing. Filed July 26, 1965, Ser. No. 474,971
Claims priority, application Great Britain, July 31, 1964, 30,330/64
The portion of the term of the patent subsequent to Apr. 23, 1985, has been disclaimed
Int. Cl. C08g 1/20
U.S. Cl. 260—73
10 Claims

ABSTRACT OF THE DISCLOSURE

A process for producing high polymers from trioxan, tetroxan, 1,3-dioxolan, 1,3-dioxepan or 1,3,5-trioxepan comprises polymerising them, with or without a comonomer, under substantially anhydrous conditions, at a temperature between —100° C. and 150° C., and in the presence of a carbonium hexafluoroantimonate or a carboxonium hexafluoroantimonate.

---

This invention relates to polymers and is especially concerned with a process for the polymerisation of cyclic acetals, i.e. compounds having a ring system wherein there is contained at least one

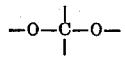

grouping.

According to the present invention a process for polymerising a cyclic acetal comprises effecting the polymerisation in the presence of a catalytic amount of a carbonium or carboxonium hexafluoroantimonate.

The term "polymerising" as used herein is intended to include homopolymerisation of the cyclic acetals, copolymerisation of the cyclic acetals with one or more other cyclic acetals, and copolymerisation of the cyclic acetals with one or more other copolymerisable compounds.

Typical cyclic acetals which may be polymerised according to the invention include trioxan, tetroxan, 1,3-dioxolan, 1,3,5-trioxepan and 1,3-dioxepan. They may be copolymerised with each other and with such other polymerisable compounds as styrene and styrene derivatives, aldehydes, allyl compounds, cyclic esters, unsaturated aliphatic hydrocarbons, vinyl ethers and esters, and N-vinyl and C-vinyl heterocyclic compounds. Suitable such copolymerisable compounds include styrene, α-methyl styrene, α-phenyl styrene, o-, m- and p-methyl styrenes, anethole, 1-vinyl naphthalene, 2-vinyl naphthalene, stilbene, indene, coumarone, acenaphthylene; chloral, benzaldehyde, anisaldehyde, cinnamaldehyde, piperonal, butyraldehyde; allyl acetate, allyl ethyl ester, allyl bromide, allyl methacrylate, allyl cellosolve, allyl cyanide, allyl benzene, allyl glycidyl ether, allyl alcohol, allyl beta-cyclohexyl propionate, allyl phenyl ether, diallyl phenyl phosphate; beta-propiolactone, delta-valerolactone, epsilon-caprolactone, trichlorethylidene lactate, methylene glycollate, lactide, ethylene oxalate, dioxanone; isobutene, butadiene, isoprene, pentadiene-1,3, cyclohexene, heptene-1, octene-1, cyclopentadiene, 4-vinyl cyclohexane, beta-pinene; methyl vinyl ether, ethyl vinyl ether, n-butyl ether, isobutyl vinyl ether, vinyl 2-ethyl hexyl ether, phenyl vinyl ether; vinyl acetate; N-vinyl carbazole, 2-vinyl pyridine and 2-vinyl-1,3-dioxan. Normally these other comonomers will make up between 0.01 and 50% of the units of the polymer, preferably between 0.1 and 20%.

Suitable carbonium and carboxonium hexafluoroantimonates for use as catalysts in this invention include triphenylmethyl hexafluoroantimonate, diphenylmethyl hexafluoroantimonate, phenyl-ditolylmethyl hexafluoroantimonate, tolyl-diphenylmethyl hexafluoroantimonate, tritolylmethyl hexafluoroantimonate, dioxolinium hexafluoroantimonate, acetyl hexafluoroantimonate and benzoyl hexafluoroantimonate.

The process is preferably carried out with the minimum of moisture and suitably under anhydrous conditions. It may be conducted under bulk, i.e., mass, conditions or it may be of advantage to conduct the polymerisation in an inert liquid medium which may be a solvent or non-solvent for the monomers under the polymerisation conditions. Suitable solvents include saturated aliphatic and cycloaliphatic hydrocarbons, chlorinated aliphatic and cycloaliphatic hydrocarbons, and aliphatic and aromatic nitrohydrocarbons. Cyclohexane is particularly suitable. It is often convenient to add the hexafluoroantimonate catalyst in the form of a solution, for example in an aliphatic nitrohydrocarbon such as nitroethane or nitropropane.

The purity of the reactants is particularly emphasised and adequate purification procedures must be adopted to ensure the substantial absence of impurities. Normally efficient distillation procedures, for example, may be adequate but such procedures may be supplemented by distillation over compounds which neutralise or react with known impurities to give inert, non-volatile or easily removed reaction products.

The temperature of the reaction may vary widely, depending on the reactants, solvent and so on but will usually be between —100° C. and +150° C., preferably between —20° C. and +100° C. The reaction may, if desired, be effected under a dry inert atmosphere, such as nitrogen. In some cases it is suitable to use superatmospheric pressure.

The catalysts of the present invention can readily be removed from the formed polymer by suitable procedures, such as washing, milling or agitating the polymer with solvents for the catalysts, neutralising agents or complexing agents for the catalysts. It is particularly effective to remove the catalyst by treatment with a basic substance such as an amine or ammonia. The polymer is then thoroughly washed after such treatment to remove all residues and dried.

There may be incorporated into the polymers formed by the process of the present invention stabilisers, antioxidants, pigments, ultra-violet light absorbers and similar materials commonly used as additives to polymeric compositions. The polymers may also, if desired, be stabilised by treating them with compounds which react with any free end groups. For instance, they may be acetylated at the end-groups by reaction with acetic acid or acetic anhydride.

It is already known to polymerise trioxan, both with and without a copolymerisable monomer, and to polymerise certain other cyclic acetals in the presence of an electrophilic catalyst, such as boron trifluoride, certain of its complexes, stannic chloride, ferric chloride, certain other inorganic fluorides and oxonium salts. We have found that the catalysts of the present invention, when applied to the polymerisation of cyclic acetals, have certain advantages over the catalysts used hitherto; for example, in the polymerisation of trioxan, the polymerisation rate is much higher and a larger percentage yield of polymer is obtained compared with known catalysts. Furthermore a trioxan-styrene copolymer produced by the method of the invention had a molecular weight more than three times the molecular weight of trioxan-styrene copolymers produced using as catalysts an oxonium fluoroborate or boron trifluoride.

3

The polymers produced in accordance with the invention are especially useful for compression, injection and extrusion mouldings.

The following examples are given for the purpose of illustrating the invention. In these examples the inherent viscosity has been determined on a 0.5% solution of the polymer in p-chlorphenol containing 2% α-pinene as stabiliser.

EXAMPLE 1

48 g. trioxan, freshly distilled from stearylamine and calcium hydride, and 40 g. dry cyclohexane were stirred together in a flask fitted with a condenser and kept at 60° C. in a waterbath. 0.00072 g. triphenylmethyl hexafluoroantimonate was added as a 1% solution in nitroethane, and polymer began to appear immediately. After 3 hours the product was filtered off and washed in acetone, milled for several hours in 1½% ammonia solution, then heated to 85° C. in 3% ammonia for 15 minutes. It was then thoroughly washed in water and acetone and dried in a vacuum oven. The yield was 26.5 g. (55% of theoretical), and the inherent viscosity of the product was 3.33.

EXAMPLE 2

43 g. trioxan, freshly distilled from stearylamine and calcium hydride, 36 g. dry cyclohexane and 1.28 g. styrene were stirred together at 60° C. and 0.0030 g. triphenylmethyl hexafluoroantimonate was added as a 1% solution in nitroethane. Reaction was immediate and after 15 minutes the resultant polymer was filtered off and treated as in Example 1. The yield was 42 g. (96% of theoretical) of white polymer with an inherent viscosity of 2.10.

EXAMPLE 3

137 g. trioxan, freshly distilled from stearylamine and calcium hydride, 274 g. dry cyclohexane, and 4.0 g. dioxolan were stirred together at 60° C., and 0.0082 g. triphenylmethyl hexafluoroantimonate was added as a 3% solution in nitroethane. After 50 minutes the resultant white polymer was filtered off and treated as in Example 1; the yield was 75 g. (55% of theoretical) and the inherent viscosity of the product 1.34.

EXAMPLE 4

To 10.0 g. freshly distilled 1,3-dioxolan was added 0.01 g. triphenylmethyl hexafluoroantimonate as a 10% solution in nitroethane. In 24 hours the whole had set to a white mass which was removed, ground to a powder and washed quickly in cold water. After drying in vacuo the yield was 8.0 g. (80% of theoretical) of a white powder, melting point 70° C.

EXAMPLE 5

A reaction vessel was charged with 50 g. trioxan (freshly distilled over stearylamine and calcium hydride), 100 g. cyclohexane and 1.5 ml. β-propiolactone. The mixture was maintained at 60° C. and stirred vigorously. 0.005 g. triphenylmethyl hexafluoroantimonate (as a 25% solution in nitroethane) was injected into the mixture, whereupon polymerisation rapidly ensued. After four and a half hours the reaction was terminated by the addition of a small amount of acetone and the product was slurried and homogenised by high speed agitation with a larger amount of acetone and filtered. The filter cake was slurried and stirred with 1% aqueous ammonia at 85° C. for 15 minutes, homogenised with water and acetone and dried in a vacuum oven at 50° C. The conversion to polymer was 52% theoretical.

EXAMPLE 6

An experiment similar to that described in Example 5 was carried out except that 1.5 mls. butyraldehyde was used as comonomer instead of β-propiolactone, and the polymerisation time was 1½ hours. Polymer was formed in 48% yield, and had an inherent viscosity of 1.95.

EXAMPLE 7

Into a reaction vessel fitted with stirrer, air condenser with silica gel drying tube attached and thermometer were charged 4.6 g. 1,3-dioxepan (freshly distilled over calcium hydride). The vessel was maintained at 60° C. and 0.00046 g. triphenylmethyl hexafluoroantimonate was added whereupon polymerisation occurred immediately. Polymerisation was terminated by addition of acetone, in which the polymer dissolved.

After reprecipitation of the polymer by addition of cold methanol, it was filtered off and dried under vacuo at room temperature. The yield of polymer was 4.1 g. The polymer was a colourless, slightly tacky, rubber solid.

Similar experiments were conducted at 20° C. and −20° C. and polymer was isolated as before.

EXAMPLE 8

A similar experiment to Example 7 was conducted except that 6.1 g. 1,3,5-trioxepan was used instead of 1,3-dioxepan. The polymer was isolated as in Example 7 and was obtained in 4.6 g. yield. It was a white, tacky solid which melted at about 30° C.

EXAMPLE 9

27 g. trioxan, freshly distilled from stearylamine and calcium hydride, 54 g. dry cyclohexane and 0.8 g. styrene were stirred together at 60° and 0.0054 g. benzoyl hexafluoroantimonate was added as a 1% solution in nitroethane. Polymerisation commenced and continued for 2 hours after which it was terminated by the addition of a small quantity of acetone, and the resultant product was washed in more acetone and in aqueous ammonia. It was then heated and stirred in more aqueous ammonia at 85° C. for 10 minutes, thoroughly washed with water, and dried in a vacuum oven at 60° C. The yield of white polymer was 18.1 g. (67% of theoretical).

EXAMPLE 10

25 g. trioxan, freshly distilled from stearylamine and calcium hydride, and 50 g. dry cyclohexane were stirred together at 60° C., and 0.00125 g. acetyl hexafluoroantimonate was added as a 1% solution in nitroethane. Polymerisation commenced immediately and continued for 2 hours after which it was terminated by addition of acetone. The polymer was isolated and treated as in Example 9, and its inherent viscosity was 1.7.

EXAMPLE 11

26 g. trioxan, freshly distilled from stearylamine and calcium hydride, 52 g. dry cyclohexane and 0.78 g. styrene were stirred together at 60° C., and 0.0052 g. diphenylmethyl hexafluoroantimonate was added as a 1% solution in nitropropane. Polymerisation soon commenced and was terminated after 3 hours by the addition of a little acetone; the resultant polymer was treated as in Example 9.

EXAMPLE 12

50.5 g. trioxan, freshly distilled from stearylamine and calcium hydride, and 50.5 g. dry cyclohexane were stirred together at 60° C., and 0.0025 g. p-tolyldiphenylmethyl hexafluoroantimonate was added as a 1% solution in nitropropane. Polymer soon appeared and after 5 hours it was filtered off and treated as in Example 9. The yield was 36.3 g. (72% of theoretical) and the inherent viscosity of the polymer 2.40.

EXAMPLE 13

53.7 g. trioxan, freshly distilled from stearylamine and calcium hydride, and 53.7 g. dry cyclohexane were stirred together at 75° C., and 0.0026 g. tris p-tolymethyl hexafluoroantimonate was added as a 1% solution in nitropropane. Polymerisation commenced, and was terminated after 3½ hours by the addition of acetone. The resultant polymer was treated as in Example 9; the yield was 30.6 g. (58% of theoretical) and the inherent viscosity of the polymer 3.20.

EXAMPLE 14

27 g. trioxan, freshly distilled from stearylamine and calcium hydride, 54 g. dry cyclohexane, and 0.8 g. 2-vinyl-1,3-dioxan were stirred together at 60° C., and 0.0048 g. triphenylmethyl hexafluoroantimonate was added as a 1% solution in nitropropane. After 3 hours the polymerisation was terminated by the addition of a little acetone and the polymer was filtered off with more acetone and washed using a high-speed stirrer. It was then similarly washed with aqueous ammonia and heated in aqueous ammonia at 85° C. for 10 minutes, before being thoroughly washed in water and dried in a vacuum oven at 60° C. The yield of white polymer was 21.5 g. (80% of theoretical) and its inherent viscosity 2.32.

EXAMPLE 15

27 g. trioxan, freshly distilled from stearylamine and calcium hydride, was stirred at 60° C. with 54 g. dry cyclohexane and 0.8 g. 4-phenyl-1,3-dioxan, and 0.0016 g. triphenylmethyl hexafluoroantimonate was added as a 1% solution in nitropropane. Polymerisation began immediately and was terminated after 3 hours by addition of acetone. The resultant polymer was treated as in Example 14. The yield of polymer was 16 g. (59% of theoretical) and its inherent viscosity 2.83.

EXAMPLE 16

28 g. trioxan, freshly distilled from stearylamine and calcium hydride, 56 g. dry cyclohexane and 0.84 g. piperonal were stirred together in a waterbath at 60° C., and 0.00335 g. triphenylmethyl hexafluoroantimonate was added as a 1% solution in nitropropane. Polymerisation ensued almost immediately, and was terminated after 3 hours by the addition of a small quantity of acetone. The polymer was treated as in Example 14; its yield was 17 g. (61 g. of theoretical) and its inherent viscosity 2.20.

EXAMPLE 17

A solution of 25 g. trioxan, freshly distilled from stearylamine and calcium hydride, and 25 g. dichlorethylene, distilled from calcium chloride, were stirred together at 30° C., and 0.0023% (based on the trioxan) of triphenylmethyl hexafluoroantimonate was added as a 1½% solution in nitropropane. Polymerisation commenced and was terminated after 3 hours by addition of acetone. The product was treated as in Example 14. The yield of polymer was 83%, and its inherent viscosity 2.34.

What is claimed is:

1. A process for polymerising a cyclic acetal selected from the class consisting of trioxan, tetroxan, 1,3-dioxolan, 1, - 3 dioxepan and 1,3,5 - trioxepan, comprising effecting the polymerisation under substantially anhydrous conditions in the presence of a catalyst selected from the class consisting of carbonium hexafluoroantimonates and carboxonium hexafluoroantimonates, the polymerisation being effected at a temperature between —100° C. and 150° C.

2. A process for polymerising a cyclic acetal according to claim 1 which comprises effecting the polymerisation in the presence of a catalyst selected from the class consisting of triphenylmethyl hexafluoroantimonate, diphenylmethyl hexafluoroantimonate, phenyl-ditolylmethyl hexafluoroantimonate, toly-diphenylmethyl hexafluoroantimonate and tritolyl-methyl hexafluoroantimonate.

3. A process for polymerising a cyclic acetal according to claim 1 which comprises effecting the polymerising in the presence of a catalyst selected from the class consisting of dioxolinium hexafluoroantimonate, acetyl hexafluoroantimonate and benzoyl hexafluoroantimonate.

4. A process for polymerising a cyclic acetal according to claim 1 which comprises effecting the polymerisation under mass polymerisation conditions.

5. A process for polymerising a cyclic acetal according to claim 1 which comprises effecting the polymerisation in the presence of an inert liquid medium.

6. A process according to claim 5 wherein the cyclic acetal is in solution in an inert liquid medium and the catalyst is added in solution in a different inert liquid medium.

7. A process according to claim 6 wherein the cyclic acetal is dissolved in cyclohexane and the catalyst is added in solution in nitroethane.

8. A process for preparing a copolymer under substantially anhydrous conditions, comprising stirring together trioxan and a copolymerisable compound selected from the group consisting of styrene, dioxolan, β-propiolactone and butyraldehyde; in cyclohexane at 60° C.; adding thereto a catalytic amount of triphenylmethyl hexafluoroantimonate in nitroethane; and recovering the resulting copolymer.

9. A process for preparing a copolymer under substantially anhydrous conditions, comprising stirring together trioxan and styrene in cyclohexane at 60° C.; adding thereto a catalytic amount of a catalytic material selected from the group consisting of benzoyl hexafluoroantimonate in nitroethane and diphenylmethyl hexafluoroantimonate in nitropropane; and recovering the resulting copolymer.

10. A process for preparing a copolymer under substantially anhydrous conditions, comprising stirring together trioxan and a copolymerisable compound selected from the group consisting of 2-vinyl-1,3-dioxan, and 4-phenyl-1,3-dioxan, and piperonal; in cyclohexane at 60° C.; adding thereto a catalytic amount of triphenylmethyl hexafluoroantimonate in nitropropane; and recovering the resulting copolymer.

References Cited

UNITED STATES PATENTS

| 3,197,438 | 7/1965 | Wood. | |
| 3,219,631 | 11/1965 | Kullmar et al. | |
| 3,316,217 | 4/1967 | Weissermel et al. | |
| 3,317,477 | 5/1967 | Wilson et al. | |
| 3,379,655 | 4/1968 | May et al. | 260—2 |

JOSEPH L. SCHOFER, Primary Examiner

J. C. HAIGHT, Assistant Examiner

U.S. Cl. X.R.

260—2, 67